United States Patent Office 3,365,482
Patented Jan. 23, 1968

3,365,482
AMMOXIDATION OF SATURATED HYDROCARBONS
Sargis Khoobiar, Clifton, N.J., assignor to Halcon International, Inc., a corporation of Delaware
No Drawing. Filed Dec. 18, 1964, Ser. No. 419,606
14 Claims. (Cl. 260—465.3)

ABSTRACT OF THE DISCLOSURE

The present invention relates to the production of alpha,beta-unsaturated nitriles by ammoxidation of saturated hydrocarbons or saturated substituted hydrocarbons in the presence of a molybdenum oxide or tungsten oxide catalyst on an activated alumina support.

This invention relates to a new and improved ammoxidation process. More specifically, the instant invention is concerned with the conversion of alkanes to alpha, beta-unsaturated nitriles.

The ammoxidation of hydrocarbons, particularly olefins and alkyl aromatics to nitrile, is well known in the art. (See U.S. Patents 2,481,826 and 2,499,055.) Basically, the hydrocarbon is reacted with ammonia and molecular oxygen in the vapor phase to form the nitrile, the remainder of the hydrocarbon structure being essentially unchanged, i.e., where an olefin is employed an unsaturated nitrile is formed, and where an alkyl aromatic is used an aromatic nitrile is obtained.

While extensive work has been done in this area, particularly in catalyst development, only recently has the ammoxidation of saturated hydrocarbons directly to the alpha,beta-unsaturated nitrile been considered. As a matter of fact, saturated hydrocarbons present in feed stream containing olefins have been regarded as inert to the reaction and considered as diluents. See specifically, Australian Patent 56,564 which is concerned with converting olefins such as isobutylene and propylene to methacrylonitrile and acrylonitrile. In the olefin ammoxidation area, British Patent 874,593 recognizes the catalytic value of copper, chromium, vanadium, manganese, iron, cobalt, nickel, molybdenum, silver, zinc, cadmium, tin, rhenium, tungsten, lead, platinum, gold, aluminum, palladium, rhodium, bismuth, and uranium in these reactions, and claims the use of oxides of molybdenum and cobalt; and compounds of molybdenum, cobalt, and oxygen, as for example, cobalt molybdate. Molybdenum compounds, such as molybdenum oxide along with alkali metal promoters on carriers, such as silica gel, kieselguhr, and alumina are claimed in British Patent 848,924. British Patent 867,438 notes an improved catalytic effect from antimony, tin and bismuth molybdates and phosphomolybdates. Bismuth phosphotungstate is also disclosed. In combination, the oxides of tin and antimony have been recognized as catalysts in British Patent 876,446. Examples of the oxides are stannic oxide and antimony tetroxide. Additionally, a British Patent 909,907 teaches the cojoint use of tungsten and tellurium compounds, including phosphotungstic acid, tungsten oxide, tellurium, and tellurium oxide.

Still another British Patent 913,832, describes the use of at least two compounds from a group consisting of cupric oxide, vanadium pentoxide, molybdenum trioxide, tellurium oxide, bismuth oxide, phosphomolybdic acid, and iron oxide on a silicic carrier such as kaolin. The addition of selenium or selenium oxide is also suggested. Bismuth and tungsten in chemical combination with oxygen, such as bismuth tungstate, on a fused alumina support has been reported as effective in British Patent 925,495. Bismuth salts of arseno heteropoly acids such as bismuth arsenomolybdate and bismuth arsenomolybdovanadate are the subject of British Patent 925,650. In British Patent 948,014 tellurium oxide and phosphomolybdic acid or molybdenum oxide on an activated alumina support is shown for the ammoxidation. The use of solid phosphoric acid and one or more compounds of titanium, manganese, iron, cobalt, nickel, copper, zinc, silver, gold, cadmium, tin, cerium, lead, bismuth, thorium, vanadium, columbium, tantalum, uranium, molybdenum and tungsten is taught in British Patent 957,022. The addition of boron compounds such as boric acid and phosphoboric acid in the aforesaid materials is also described. Finally, in British Patent 967,878 molybdenum and silicon compounds with or without the addition of beryllium, calcium, strontium, barium, zinc, cadmium, lithium, sodium, and silver coated on crystalline aluminum silicate, corundum, quartz, feldspar or granite is known.

The above enumeration of effective catalysts clearly point out the comparative ease in effecting the olefin reaction. Unfortunately, saturated compounds, which are more readily available and are more desirable raw materials, do not have a comparable reactivity to alpha,beta-unsaturated nitriles.

The difficulty in ammoxidizing saturated hydrocarbons to the unsaturated nitriles is that, in effect, a dehydrogenation must also be performed. Furthermore, ammonia which is an essential reactant tends to burn under the more severe reaction conditions. It became immediately apparent that while some catalysts can ammoxidize and others dehydrogenate and still others avoid the combustion of the ammonia, the combination of the three effects could not be readily achieved.

Catalysts tested, many of which were outstanding for ammoxidizing olefins and alkyl aromatics, were wholly unsuccessful for isobutane and the like and yielded results completely unadaptable for commercial development.

In accordance with this invention, applicant has discovered that saturated compounds, specifically hydrocarbons and substituted hydrocarbons having from 3 to 12 carbon atoms per molecule and preferably from 3 to 9, may be readily ammoxidized directly in one step to alpha, beta-unsaturated nitriles by employing a molybdenum or tungsten catalyst supported on an activated alumina. The compounds which may be reacted have the basic structure:

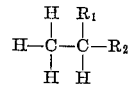

wherein $R_1$ is hydrogen, an alkyl or an aryl group; and $R_2$ is an alkyl group or a substituted alkyl group, wherein the substitution is an aryl, halogen, nitrogen, or oxygen group. The alkyl groups have from one to eight carbon atoms per molecule, preferably from one to four, as for example, methyl, ethyl, isobutyl, hexyl, and octyl. Most common of the aryl groups is the phenyl group. Halogen substitutions include the chloro, fluoro, bromo and iodo radicals. Exemplary of nitrogen substitution is the amino group; oxygen substitutions include the hydroxyl, carboxyl and carbonyl radicals. These latter substitutions form alcohols, acids, ketones and aldehydes.

Preferred reactions are the ammoxidation of propane to acrylonitrile and isobutane to methacrylonitrile.

Examples of other saturated hydrocarbons are n-butane, pentane, isopentane, dimethylpentane, ethyl pentane, heptane, decane, dodecane, cumene, and phenyl propane.

As noted above, specific examples of the foregoing compounds are substituted hydrocarbons including propionaldehyde, propionic acid, 1-propanol, 1-propylamine, isobutyric acid, isobutanol, isobutylamine, isobutyraldehyde, 2-ethyl-1-propanol, 2-phenyl propane, cyclohexyl propionic acid, 2-phenyl-1-propanol and 1-chloropropane, and 1-chloroisobutane.

In a particularly preferred embodiment of the invention the reaction is performed in the presence of the aforesaid catalyst wherein the activated alumina is treated with an impurity or a "dopand," such as a compound of antimony, tungsten, titanium, and tin.

The ammoxidation is generally performed at a temperature of from 300° to 800° C., preferably from 400° to 700° C., and space velocities of from 400 to 20,000/hours, preferably 2000 to 10,000/hours are employed. Atmospheric pressure is desirable, but pressures from 2 to 1000 p.s.i.a. may be employed.

The feed composition, expressed in mole percents, should be broadly as follows: 0.1 to 35% saturated organic compound, 0.1 to 30% oxygen, 0.1 to 35% ammonia. The presence of steam is desirable, but need not be added since it is generated in the reaction. Most preferred ranges are 0.5 to 15% saturated hydrocarbons, 1 to 10% oxygen, 0.1 to 10% ammonia, and 2 to 70% steam.

The high purity activated aluminas of the invention have a surface area over 10 m.$^2$/gram and preferably are over 99% pure. Well known examples of these aluminas are eta-alumina (beta-alumina trihydrate) and catalyst grade gamma-alumina, F–110.

Certain impurities in the support are detrimental to the effectiveness of the final catalyst. For instance, significant quantities of sodium appear to be harmful as evidenced by the outstanding results achieved with eta-alumina, a sodium-free alumina (less than 10 p.p.m.); the good, but less effective, results obtained with the F–110 gamma-alumina, which contains 0.01% sodium, and the inoperativeness of drying aluminas having about 2% sodium. As a general rule, sodium contamination should be limited to less than 1%, preferably less than 0.1%.

Heat treating the activated aluminas of the invention results in an outstanding catalyst. It is particularly beneficial with gamma-alumina, perhaps because the adverse effect of the sodium is offset. Even with the eta-alumina better yields result. The heat treatment may be at a temperature from 500° to 2000° C. for 1 to 100 hours, preferably the temperature is 800 to 1400° C. for 10 to 30 hours. Without intending to limit the invention, it is theorized that the heat treatment of the gamma-alumina results in the formation of eta-alumina and theta-alumina. The heat treatment of eta-alumina apparently results in at least a partial conversion to theta-alumina. While eta-alumina alone is effective, when a portion thereof is converted to theta-alumina a superior support is formed. Various aluminas have been studied by employing X-ray powder defraction analysis, but the results of these analyses are not regarded as sufficiently definite to firmly establish their crystal structure and lattice.

It should be understood that while the alumina modifications of the invention is most preferably formed by heat treating appropriate active aluminas, it is within the scope of the invention to employ other equivalent structures regardless of the mode of preparation. Additionally, while it is generally advantageous to heat treat in an inert atmosphere such as air or nitrogen, steam may be employed with a possible alteration of the times and temperatures of the heat treatment.

Because of the friable nature of active alumina, the heating and cooling must be done with care to prevent cracking due to expansion and contraction. By heating to a temperature just over 100° C., preferably 120° to 170° C., absorbed water is driven off. This temperature should be maintained for at least 20 hours and then gradually increased to about 500° C. for removal of the last traces of water. After at least 2 or 3 hours the temperature may be slowly raised to the final heat treating temperature. Preferably heating to the final temperature should be at a rate less than 100° C. per hour. Similarly, the heat treated material should be cooled slowly over a period of about 5 to 6 hours to prevent fracture of the crystals.

The support may be fabricated in any desirable manner, for instance, by extruding or pelletizing or, for fluidized bed applications, as a powder. Other manufacturing variations are permissible, such as impregnating the powder and thereafter pelletizing the catalyst.

Distribution of the catalyst is most effectively done by impregnation of the support with a solution of soluble forms of the catalyst. A true solution need not be used—even a colloidal suspension of the catalyst may be used—so long as the catalyst is effectively distributed over the surface of the support. While water is the most common solvent in forming the impregnating solution, an organic solvent such as benzene is suitable.

Convenience dictates the use of a concentrated solution of the catalytic material, most preferably, a saturated solution; a dilute solution can be applied, though with no apparent advantage, because of the use and evaporation of more solvent.

Examples of soluble forms of the molybdenum and tungsten catalysts are the nitrates, carbonates, chlorides, sulphates, hydroxides and organic acid salts, e.g., acetates, stearates, and naphthenates. Ammonium and other soluble salts of the molybdates and tungstates are also applicable. Upon hydrolysis and heating, the catalytic material is converted to the oxides which interact with the theta-alumina to form the active catalyst. Hydrolysis is encouraged by the presence of ammonia, water, alcohol, or basic material, such as amines.

Ultimately, the amount of catalytic material in the impregnating solution and the quantity of solution contacted with the support is determined by the weight of the catalytic oxide required. As little as 0.01 atom/100 moles of catalyst support will be operative. Practically, 100 atoms is the upper limit, but a positive effect is achieved with more. Generally, from 1 to 30 atoms per 100 moles of alumina are employed.

After contacting the support and the impregnating solution, the coating step is carried out by evaporating the solvent. The bulk of the solvent is driven off at a temperature close to or at the boiling temperature of the solution. Thereafter, the coated catalyst is heated to a temperature from 200 to 700° C. for at least one hour to convert the catalyst to its active form. Best results are obtained by heating to 300° to 600° C., for a period of from 4 to 5 hours. The catalyst can also be made by mixing molybdenum trioxide or tungsten trioxide as a fine dry powder with the support.

When the dopand is used, it is preferably introduced into the alumina prior to the heat treatment. This procedure improves the conversion and selectivity of the ammoxidation reaction.

It is theorized that the presence of the dopand serves one or more functions namely: the stabilization of the alumina crystal; the formation of a thin surface coating which may effect the alumina and the catalyst; diffusion throughout the alumina and interaction solely therewith; as a promoter to the catalyst phase for the purpose of raising selectivity.

The introduction of the impurity or dopand is accomplished in essentially the same manner as the introduction of the catalyst metal. As in the case of the catalyst, it is generally desirable to prepare a soluble decomposable salt of the antimony, tungsten, titanium or tin, though a colloidal dispersion is satisfactory for distributing the material. The impregnating solution is formed by dissolving or dispersing the salt therein. Decomposition is effected by hydrolysis and heating, the hydrolysis resulting in the formation of an hydroxide and the subsequent heating resulting in the formation of the oxide, the particularly active form of the impurity.

Examples of the decomposable salts which may be used are nitrates, carbonates, chlorides, hydroxides, sulfates and organic acid salts such as acetates, stearates, and naphthenates. Additionally, ammonium or other soluble salts may be employed where the dopand metal forms part of an anion, as for example in the antimonates, stannates, titanates, and tungstates. Hydrolysis is facilitated by the presence of water, ammonia, alcohol or basic materials such as the organic amines. Preferably, a saturated solution is employed so as to require the evaporation of a minimum amount of the solvent. Naturally, an adequate amount must be employed to wet the entire support surface. The particular quantity of solution and the concentration of metal therein is ultimately determined by the amount of impurity required for a particular amount of alumina support. Broadly, it is desirable to have from 0.01 to 50 atoms of the metal impurity for each 100 moles of support. Most preferable from 1 to 20 atoms per 100 moles are used.

The impregnating solution containing the support is heated to evaporate the solvent at a temperature at or close to the boiling point. After the solvent is evaporated and the salt or hydroxide is precipitated uniformly on the support, the heat treating step as previously disclosed is carried out. After the alumina is impregnated with an impurity and heat treated, the support is conventionally referred to as "doped."

Procedurely, it is preferable that the activated alumina be first impregnated with the dopand, dried; and, thereafter, heat treated to form the support. After cooling, the catalyst impregnation is performed. It should be understood that modifications of this procedure can be effectively employed. For example, the doping may take place after the completion of the heat treatment, but prior to catalyst addition. Another example would be to introduce the dopand and catalyst together after heating of the support. Furthermore, the last two examples could be followed without heat treatment of the support.

While not essential for the practice of the invention, promoters may be employed such as is well known in the art. Additionally, the catalyst may be extended by the use of other supports or refractory material. For example, the supported catalyst of the invention may be distributed on or intermixed with brick, pumice, carborundum or other high refractory material.

While ammonia is most generally employed as the nitrogen-providing compounds, other materials may be employed. For example, ammonia may be generated in situ from decomposable ammonium compounds such as ammonium carbonate, or from various amines, such as methylamine, ethylamine and aniline. Other nitrogen-providing compounds of value are oxides of nitrogen such as nitric oxide. These latter nitrogen-providing compounds are used in the same or higher proportions than the ammonia set forth above. Generally, from 1 to 5 moles per mole of the organic compound are used. Nitric oxide is preferably used in the absence of oxygen.

In order to describe the invention more fully the following examples are set forth:

*Example 1*

A ½" by 6" isothermal reactor is filled with 15 cc. of ¹⁄₁₆" extruded catalyst, as described hereinafter, and a feed containing 5.3% isobutane, 24.3% air, 5.3% ammonia and 66.4% steam, all on a molar basis, is passed through the reactor at a space velocity of 4100/hour and at a block temperature of about 508° C. The reactor effluent is analyzed to determine isobutane conversion and molar selectivity to methacrylonitrile. The alumina, described in the following table, is coated with a catalyst by contacting 100 moles thereof with 20 atoms of molybdenum as $(NH_4)_6Mo_7O_{24} \cdot 4H_2O$ dissolved in 50 cc. of distilled water. The water is evaporated, the catalyst is placed in a furnace and slowly heated to 500° C. This temperature is maintained for 16 hours after which it is cooled and ready for use in the ammoxidation process.

In the following table, where a heat treatment is indicated, it is performed by first heating the support for four hours at 500° C. and then slowly heating the catalyst to the final heat treating temperature for about 16 hours. The heating rate is less than 100° C. per hour.

TABLE I

| Catalyst | Support | Heat Treatment Temp., °C. | Conversion, Percent | Selectivity, Percent |
|---|---|---|---|---|
| Molybdenum | Eta-alumina | | 29 | 10 |
| Do | do | 800 | 28 | 15 |
| Do | do | 1,000 | 31 | 18 |
| Do | do | 1,200 | 30 | 22.9 |
| Do | Gamma-alumina Alcoa F-110 | | 10 | 40 |
| Do | do | 600 | 25 | 1 |
| Do | do | 800 | 28 | 5 |
| Do | do | 1,000 | 30 | 12 |
| Do | Drying alumina Alcoa F-1 | 600 | 5 | Nil |
| Do | do | 800 | 2 | Nil |
| Do | do | 1,200 | 1 | Nil |
| Tungsten | Eta-alumina | None | 28 | 8 |
| Do | do | 1,000 | 32 | 14 |
| Do | Gamma-alumina Alcoa F-110 | 1,000 | 28 | 10 |

The above table illustrates that the reaction takes place only with the high purity activated alumina, namely, the eta- and gamma-alumina. The eta-alumina functions without the heat treatment, but gives improved results where a heat treatment is performed. The gamma-alumina is less effective unless it is heat treated. Additionally, the above table shows that a drying alumina, containing about 2% sodium, is not effective for the ammoxidation reaction even where heat treatment is applied. Both molybdenum and tungsten yield outstanding results on the appropriate high purity alumina supports.

*Example 2*

Using the same catalyst formulation and catalyst procedure described in Example 1, runs are performed using other supports. The supports tested are silicon carbide, silica-alumina and a Linde 13X molecular sieve. No conversion is recorded.

*Example 3*

The addition of a dopand to the support and the subsequent formulation of the catalyst is a particularly preferred embodiment of the invention. To illustrate the dopand's effect 50 grams of eta-alumina are contacted with 23 grams of antimony trichloride dissolved in about 200 cc. of concentrated hydrochloric acid. The solution is evaporated and the support cooled and treated with 20 cc. of concentrated ammonium hydroxide to convert the chloride to antimony hydroxide. The water is again evaporated and the support placed in a furnace and very slowly heated first over a period of 4 hours up to 500° C. and then for 16 hours at 1200° C. to complete the heat treatment. Thereafter the doped alumina is treated with a molybdenum or tungsten salt as described in Example 1.

TABLE II

| Catalyst, moles | Dopand, atoms | Conversion, percent | Selectivity, percent |
|---|---|---|---|
| Molybdenum | Antimony | 22.4 | 49.0 |
| Do | Titanium | 30.7 | 33.7 |
| Do | Tungsten | 27.6 | 31.0 |
| Do | Tin | 29.2 | 34.0 |
| Tungsten | Antimony | 9.1 | 47.0 |

The above results show a particularly good conversion and selectivity by using the preferred doped catalyst of the invention.

*Example 4*

To show the unique behavior of the molybdenum and tungsten catalyst in the invention a variety of different catalyst metals are tested. The results obtained are shown in the following table. In every case an eta-alumina support heat treated to 1200° for 16 hours and containing an antimony dopand is used. The catalysts are introduced as nitrates, except for the antimony where the chloride is used, in amounts equivalent to the molybdenum employed in Example 1.

TABLE III

| Catalyst | Conversion, percent | Selectivity, percent |
| --- | --- | --- |
| Chromium | 3.8 | 22.0 |
| Vanadium | 6.7 | 20.7 |
| Tin | 0 | 0 |
| Tantalum | 18.6 | 5.1 |
| Uranium | 0 | 0 |
| Nickel | 10.4 | 6 |
| Copper | 0 | 0 |
| Antimony | 3.5 | 17.5 |

It should be observed that none of these metals gives more than trace amounts of conversions and selectivities. The yields of desired product are far less than those obtained by the catalyst of the invention. Many of the above catalysts are disclosed as effective for the ammoxidation of olefins. The failure of these catalysts to function for paraffin ammoxidation clearly shows that the reactions are not equivalent.

*Example 5*

The catalysts set forth in Table II are prepared using the antimony doped alumina, rather than merely the heat treated alumina. Despite the addition of the dopand no conversion was achieved with the copper, uranium, and strontium catalysts. The chromium, vanadium, tantalum, nickel, and antimony gave yields (conversion times selectivities) of less than 2½%.

*Example 6*

Example 3 illustrates the advantage of a particular class of dopands in the reaction. Other materials are introduced as the dopand and the catalyst prepared in accordance with the procedure of Example 3. The results are shown in the following table:

TABLE IV

| Catalyst | Dopand | Conversion, percent | Selectivity, percent |
| --- | --- | --- | --- |
| Molybdenum | Barium | 21.5 | 16.7 |
| Do | Sodium | 3.0 | nil |
| Do | Cadmium | Trace | Trace |
| Do | Manganese | 2.3 | 51.0 |
| Do | Cerium | 15.0 | 3.5 |
| Tungsten | Sodium | 4.0 | 0 |

This table shows the deleterious effect of alkali metals, e.g., sodium, and alkaline earth metals, namely, barium and cadmium. Additional metals, closely related to the dopands shown in Example 3 are also inoperative.

*Example 7*

Propane is ammoxidized using the catalyst and procedure described in Example 3. The feed stream contains 5.2 mole percent propane, 24.8 mole percent air, 3.5 mole percent ammonia, and 66.5 mole percent steam and the reaction is carried out at 550° C. Upon analysis of the reactor effluent, it is noted that 29% of the propane at a molar selectivity of 15% to acrylonitrile.

*Example 8*

Using the catalyst and reaction conditions described in Example 3, isobutyl chloride is used in place of the isobutane. A conversion of about 15% at a selectivity of about 40% to methacrylonitrile is obtained.

*Example 9*

Using the catalyst and reaction conditions described in Example 3, isobutylaldehyde is used in place of the isobutane. A conversion of about 25% at a selectivity of about 45% to methacrylonitrile is obtained.

*Example 10*

Using the catalyst and reaction conditions described in Example 3, isobutylamine is used in place of the isobutane. A conversion of about 21% at a selectivity of about 55% to methacrylonitrile is obtained.

*Example 11*

50 mole percent of isobutane and 50 mole percent of nitric oxide (NO) are passed through a reaction at a space velocity of 50/hour in the presence of the molybdenum catalyst supported on an antimony doped alumina support as described in Example 1. Methacrylonitrile is produced as ascertained by vapor chromatography.

It will be understood that modifications and variations may be affected without departing from the spirit of the invention.

I claim:

1. A process for the preparation of an alpha,beta-ethylenically unsaturated mononitrile which comprises contacting at temperatures of from 300° C. to 800° C. a mixture comprising from 0.1 to 35 mol percent of a compound having the formula

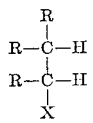

wherein X is selected from the group consisting of —CH$_3$,

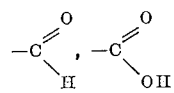

—CH$_2$OH, —CH$_2$NH$_2$ or CH$_2$-halogen, wherein said X group is converted to the nitrile group, and wherein each R is hydrogen or a saturated monovalent organic hydrocarbon radical, said compound having up to 12 carbon atoms, from 0.1 to 30 mol percent oxygen and from 0.1 to 35 mol percent ammonia with a supported catalyst consisting essentially of at least one member selected from the group consisting of molybdenum oxide or tungsten oxide wherein the support is activated alumina having a surface area of over 10 m.²/gram.

2. The process of claim 1 wherein the activated alumina is eta-alumina.

3. The process of claim 1 wherein said compound is propane.

4. The process of claim 1 wherein said compound is isobutyraldehyde.

5. The process of claim 1 wherein said compound is isobutyric acid.

6. The process of claim 1 wherein said compound is isobutanol.

7. The process of claim 1 wherein said compound is isobutylamine.

8. The process of claim 1 wherein said compound is isobutyl chloride.

9. A process according to claim 1 wherein the catalyst support additionally contains antimony, tungsten, tin or titanium when the catalyst is molybdenum oxide, and wherein the catalyst support additionally contains antimony, tin or titanium when the catalyst is tungsten oxide.

10. The process of claim 9 wherein said alumina is heat treated at a temperature between 500 and 2000° C. for at least 1 hour.

11. A process for the preparation of methacrylonitrile which comprises reacting a feed mixture containing from 0.1 to 35 mol percent isobutane, from 0.1 to 30 mol percent oxygen and from 0.1 to 35 mol percent ammonia in the presence of a supported catalyst consisting essentially of at least one member selected from the group consisting of molybdenum oxide or tungsten oxide wherein the support is activated alumina having a surface area of over 10 m.²/gram.

12. A process according to claim 11 wherein the isobutane is present in an amount of from 0.1 to 35 mol percent, and wherein the support has been heat treated at a temperature of from about 500 to 2000° C.

13. A process according to claim 12 wherein the catalyst is molybdenum oxide, and wherein the catalyst support additionally contains antimony, and wherein the support has been heat treated to a temperature of 800° C. to 1500° C.

14. A process according to claim 11 wherein nitric oxide is used in place of oxygen and ammonia.

References Cited

UNITED STATES PATENTS

| | | | |
|---|---|---|---|
| 2,518,295 | 8/1950 | Denton et al. | 260—465 |
| 2,540,787 | 2/1951 | Klimitas et al. | 260—465 |
| 2,833,807 | 5/1958 | Farkas et al. | 260—465 |
| 2,838,558 | 6/1958 | Hadley et al. | 260—465 |
| 2,846,462 | 8/1958 | Hadley | 260—465 |
| 3,041,368 | 6/1962 | Lind et al. | 260—465 |
| 3,118,928 | 1/1964 | Garrison | 260—465.3 |
| 3,278,573 | 10/1966 | Kroeper et al. | 260—465 |

JOSEPH P. BRUST, *Primary Examiner.*